(12) United States Patent
Magklis et al.

(10) Patent No.: US 11,775,297 B2
(45) Date of Patent: Oct. 3, 2023

(54) TRANSACTION NESTING DEPTH TESTING INSTRUCTION

(71) Applicant: Arm Limited, Cambridge (GB)

(72) Inventors: Grigorios Magklis, Cambridge (GB); Matthew James Horsnell, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/651,045

(22) PCT Filed: Aug. 21, 2018

(86) PCT No.: PCT/EP2018/072560
§ 371 (c)(1),
(2) Date: Mar. 26, 2020

(87) PCT Pub. No.: WO2019/063203
PCT Pub. Date: Apr. 4, 2019

(65) Prior Publication Data
US 2020/0257551 A1  Aug. 13, 2020

(30) Foreign Application Priority Data
Sep. 29, 2017  (EP) .................... 17386030

(51) Int. Cl.
*G06F 9/30* (2018.01)
*G06F 9/38* (2018.01)
*G06F 9/46* (2006.01)

(52) U.S. Cl.
CPC ...... *G06F 9/30021* (2013.01); *G06F 9/30058* (2013.01); *G06F 9/30076* (2013.01);
(Continued)

(58) Field of Classification Search
CPC ............. G06F 9/30021; G06F 9/30058; G06F 9/30076; G06F 9/30094; G06F 9/3842; G06F 9/467
See application file for complete search history.

(56) References Cited

U.S. PATENT DOCUMENTS

| 5,125,092 A * | 6/1992 | Prener ................. G06F 9/30094 |
| | | 717/149 |
| 2007/0106883 A1* | 5/2007 | Choquette ........... G06F 9/30043 |
| | | 712/225 |

(Continued)

FOREIGN PATENT DOCUMENTS

| CN | 104350463 | 2/2015 |
| JP | 2015-523651 | 8/2015 |

(Continued)

OTHER PUBLICATIONS

Intel, "Intel Architecture Instruction Set Extensions Programming Reference", Feb. 2012, 598 pages (relevant pages: Chapter 8, pp. 1-24).*

(Continued)

*Primary Examiner* — David J. Huisman
(74) *Attorney, Agent, or Firm* — NIXON & VANDERHYE P.C.

(57) ABSTRACT

In a system providing transactional memory support, a transaction nesting depth testing instruction is provided for triggering processing circuitry 4 to set at least one status value to one of a plurality of states depending on a transaction nesting depth indicative of a number of executed transaction start instructions of a given thread for which the corresponding transaction remains unaborted and uncommitted, the plurality of states including a first state selected when the transaction nesting depth is 1 and at least one further state selected when the transaction nesting depth is greater than or less than 1. The supported ISA enables the (Continued)

setting of the at least one status value and a conditional branch conditional on the at least one status value being in the first state to be performed in response to a single transaction nesting depth testing instruction and a single conditional branch instruction.

15 Claims, 6 Drawing Sheets

(52) U.S. Cl.
CPC ........ *G06F 9/30094* (2013.01); *G06F 9/3842* (2013.01); *G06F 9/467* (2013.01)

(56) References Cited

U.S. PATENT DOCUMENTS

| | | | |
|---|---|---|---|
| 2007/0162520 A1* | 7/2007 | Petersen | G06F 11/141 |
| 2009/0182983 A1* | 7/2009 | Greiner | G06F 9/30094 |
| | | | 712/205 |
| 2010/0023703 A1 | 1/2010 | Christie et al. | |
| 2013/0205119 A1* | 8/2013 | Rajwar | G06F 9/3842 |
| | | | 712/208 |
| 2013/0339796 A1* | 12/2013 | Greiner | G06F 9/466 |
| | | | 714/E11.029 |
| 2014/0047205 A1* | 2/2014 | Frey | G06F 3/0668 |
| | | | 711/163 |
| 2015/0242218 A1 | 8/2015 | Shum et al. | |
| 2016/0364707 A1 | 12/2016 | Varma | |
| 2017/0269960 A1 | 9/2017 | Diestelhorst et al. | |

FOREIGN PATENT DOCUMENTS

| | | |
|---|---|---|
| JP | 2016-537709 | 12/2016 |
| KR | 10-2011-0044884 | 5/2011 |
| TW | 201643703 | 12/2016 |

OTHER PUBLICATIONS

Intel, "Intel 64 and IA-32 Architectures Optimization Reference Manual", Jun. 2016, 672 pages (relevant pages: Chapter 12, pp. 1-30).*
"Table of Branch Instructions", Central Connecticut State University, Oct. 21, 2002, 1 page, Retrieved from the Internet <URL: https://web.archive.org/web/20021021005107/https://chortle.ccsu.edu/assemblytutorial/Chapter-24/ass24_4.html >.*
Extended European Search Report for EP Application No. 17386030.5 dated Apr. 5, 2018, 6 pages.
International Search Report and Written Opinion of the ISA for PCT/EP2018/072560 dated Nov. 16, 2018, 12 pages.
Office Action for TW Application No. 107131991 dated Apr. 18, 2022 and English translation, 17 pages.
Office Action for IN Application No. 202047011256 dated Mar. 23, 2022, 6 pages.
Office Action for JP Application No. 2020-516707 dated Aug. 23, 2022 and English translation, 6 pages.
Office Action for IL Application No. 273130 dated Oct. 23, 2022, 3 pages.
First Office Action for CN Application No. 201880060691.0 dated Jan. 5, 2023 and English translation, 20 pages.
Office Action for KR Application No. 10-2020-7010274 dated Feb. 17, 2023 and English translation, 8 pages.

* cited by examiner

| nesting depth | N | Z | C | V |
|---|---|---|---|---|
| 0 | X | 0 | 0 | X |
| 1 | X | 1 | 1 | X |
| >1 | X | 0 | 1 | X | ttest Rx

| nesting depth | Rx set to: |
|---|---|
| 0 | 0b00 |
| 1 | 0b01 |
| >1 | 0b10 |

CBZ Rn, label
   (branch to label if all bits in
     Rn are zero)

TBZ Rt, #imm, label
   (branch to label if bit #imm of Rt
     equals 0)

TBNZ Rt, #imm, label
   (branch to label if bit #imm of Rt
     equals 1)

FIG. 6

TRANSACTION NESTING DEPTH TESTING INSTRUCTION

This application is the U.S. national phase of International Application No. PCT/EP2018/072560 filed Aug. 21, 2018 which designated the U.S. and claims priority to EP Patent Application No. 17386030.5 filed Sep. 29, 2017, the entire contents of each of which are hereby incorporated by reference.

The present technique relates to the field of data processing. More particularly, it relates to transactional memory.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

At least some examples provide an apparatus comprising:
an instruction decoder to decode instructions; and
processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions of the transaction until the transaction end instruction is reached, and to abort processing of the transaction when an abort event occurs before reaching the transaction end instruction;
wherein in response to decoding of a transaction nesting depth testing instruction by the instruction decoder, the processing circuitry is configured to set at least one status value to one of a plurality of states selected dependent on a transaction nesting depth indicative of a number of executed transaction start instructions of a given thread for which the corresponding transaction remains unaborted and uncommitted, the plurality of states including a first state selected when the transaction nesting depth equals a predetermined number greater than zero, and at least one further state selected when the transaction nesting depth is greater than or less than the predetermined number; and
the instruction decoder is configured to support an instruction set architecture comprising at least one type of conditional branch instruction enabling the instruction decoder, in response to a single transaction nesting depth testing instruction followed by a single conditional branch instruction, to control the processing circuitry to set the at least one status value dependent on the transaction nesting depth and perform a conditional branch conditional on the at least one status value being in the first state.

At least some examples provide a data processing method comprising:
decoding instructions using an instruction decoder; and
performing data processing in response to the instructions decoded by the instruction decoder, using processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions of the transaction until the transaction end instruction is reached, and to abort processing of the transaction when an abort event occurs before reaching the transaction end instruction;
in response to decoding of a single transaction nesting depth instruction, setting at least one status value to one of a plurality of states selected dependent on a transaction nesting depth indicative of a number of executed transaction start instructions of a given thread for which the corresponding transaction remains unaborted and uncommitted, the plurality of states including a first state selected when the transaction nesting depth equals a predetermined number greater than zero, and at least one further state selected when the transaction nesting depth is greater than or less than the predetermined number; and in response to decoding of a single conditional branch instruction following the single transaction nesting depth instruction, performing a conditional branch conditional on the at least one status value being in the first state.

At least some examples provide a computer program for controlling a host data processing apparatus to provide an instruction execution environment for execution of instructions, comprising:

processing program logic to support execution of a transaction within a thread of data processing, the transaction comprising instructions of the thread executed speculatively between a transaction start instruction and a transaction end instruction, for which the processing program logic is configured to prevent commitment of results of the speculatively executed instructions of the transaction until the transaction end instruction is reached, and to abort processing of the transaction when an abort event occurs before reaching the transaction end instruction; and wherein in response to a transaction nesting depth testing instruction, the processing program logic is configured to set at least one status value to one of a plurality of states selected dependent on a transaction nesting depth indicative of a number of executed transaction start instructions of a given thread for which the corresponding transaction remains unaborted and uncommitted, the plurality of states including a first state selected when the transaction nesting depth equals a predetermined number greater than zero, and at least one further state selected when the transaction nesting depth is greater than or less than the predetermined number; and the processing program logic is configured to support an instruction set architecture comprising at least one type of conditional branch instruction enabling the processing program logic, in response to a single transaction nesting depth testing instruction followed by a single conditional branch instruction, to set the at least one status value dependent on the transaction nesting depth and perform a conditional branch conditional on the at least one status value being in the first state.

A storage medium may store the computer program. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus having transactional memory support circuitry;

FIG. 6 shows a second example of a transaction nesting depth testing instruction;

Figure 1:
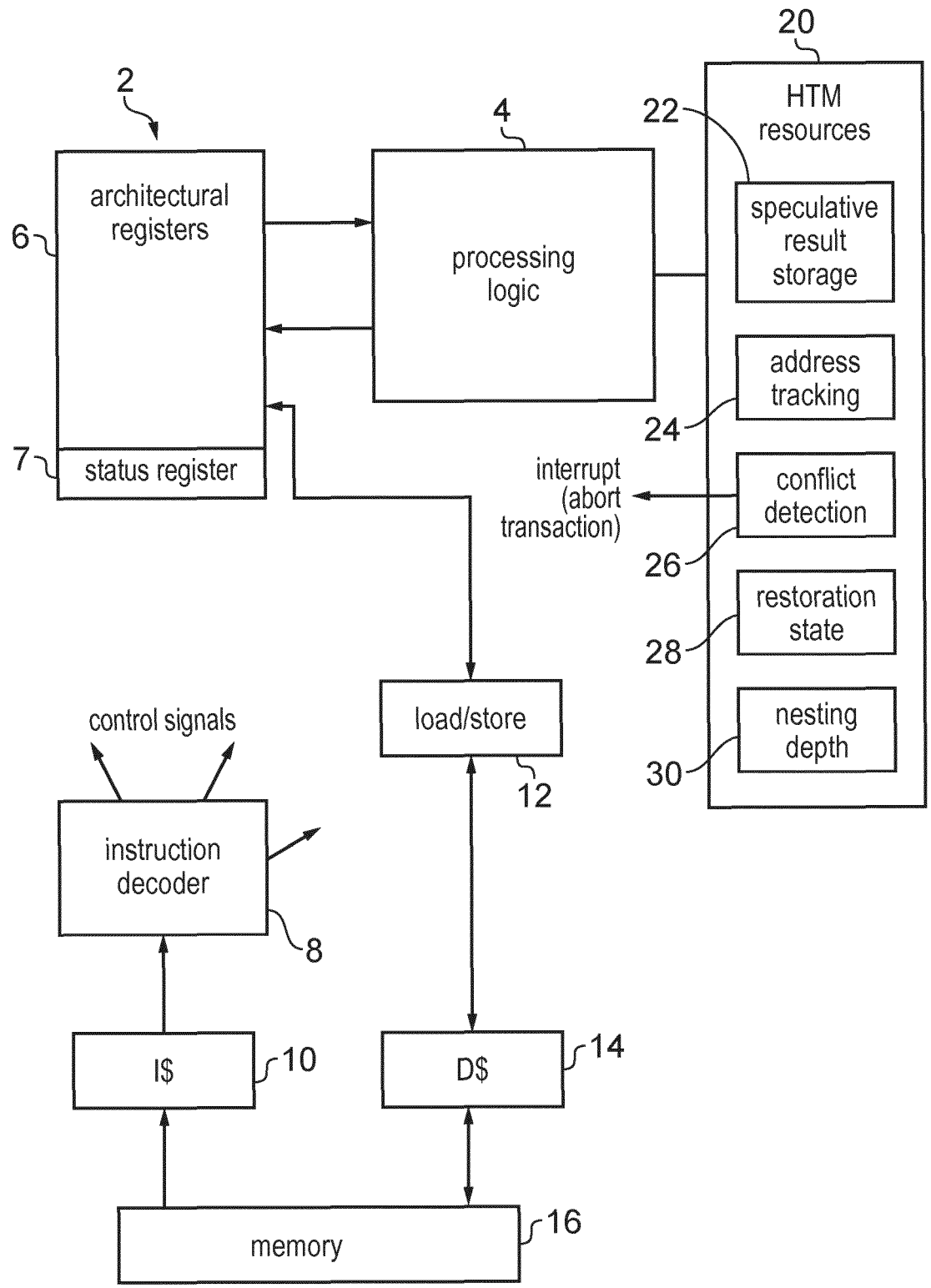

A data processing apparatus may have processing circuitry which has transactional memory support circuitry to support execution of a transaction within a thread of data processing by the processing circuitry. The transaction comprises instructions of the thread which are executed speculatively between a transaction start instruction and a transaction end instruction, for which the processing circuitry may prevent commitment of results of the speculatively executed instructions of the transaction until the transaction end instruction is reached, and may abort processing of the transaction when an abort event occurs before reaching the transaction end instruction.

Sometimes, the program code being executed may include a nested set of transactions, where a transaction start instruction for an inner transaction is executed after the transaction start instruction for an outer transaction but before the transaction end instruction of the outer transaction is reached and before the outer transaction is aborted. Although it is possible for some hardware implementations to separately track the speculative results of each transaction of the set of nested transactions, and enable rewinding of state to the start of any of the nested transactions, in practice this may require significant resources within the transactional memory support circuitry to store multiple sets of state restoration data or multiple sets of speculative results. In practice, this added resource may not be justified, and so often the processing circuitry may (for at least some purposes) effectively ignore any inner transactions of the nested set, simply treating all the operations that lie within the bounds of the transaction start and end instructions of the outer transactions as a single transaction. For example, if an abort event occurs at any point during the nested set of transactions then this may trigger restoration of state back to the transaction start instruction of the outer transaction. Transaction end instructions of inner transactions may be ignored, and it may be the transaction end instruction of the outer transaction which triggers committing of the speculatively executed instructions results. Even if the hardware does not actually track each individual transaction's state separately within a nested set of transactions of a given thread, it may still be useful for software to define such nested transactions, for example to handle cases where a branch may branch to a part of the program that lies beyond the first transaction start instruction and it is still desired to use transaction-based mechanisms to ensure atomicity of operations following the branch entry point.

Sometimes, software executed on the processing circuity may need to know whether the current point of execution lies inside a started but uncommitted and unaborted transaction, or whether if within such transaction, the current transaction is an outer transaction or an inner transaction of a nested set. For example, decisions on the scheduling of transactions, or on how to respond to abort events, may be made depending on whether the current processing is in an inner or outer transaction. Also, the level of nesting may be an indirect way of identifying the point relative to preceding transaction start instructions at which a branch was made. To assist with tracking the current level of transaction nesting, the processing circuitry may maintain a transaction nesting depth value which indicates the transaction nesting depth. The transaction nesting depth may be indicative of a number of executed transaction start instructions for a given thread for which the corresponding transaction remains unaborted and uncommitted. For example, when the transaction nesting depth is zero this may indicate that no transactions have been started, when the transaction nesting depth is one then this may indicate that the current point of execution is within the outer transaction, and when the transaction nesting depth is two or more, then this may indicate that the current transaction is an inner transaction of a nested set of transactions.

One approach for exposing information on the transaction nesting depth to the software may be to provide a depth testing instruction which compares the current transaction nesting depth with zero and returns a Boolean value indicating whether or not the transaction nesting depth is currently zero. However, this type of instruction would be unable to give an indication of whether processing is within an inner or outer transaction of a nested set. Another approach may be to provide an instruction which reads the transaction nesting depth and places a value within a software-accessible register to indicate the exact transaction nesting depth for the current point of execution within a thread. While this may enable the software to determine whether an inner or outer transaction is being processed, this may require a further instruction to compare the transaction nesting depth with a reference value, before performing a conditional branch based on the output of that comparison operation, i.e. two further instructions would be needed to trigger the conditional branch, in addition to the instruction which set the register based on the transaction nesting depth.

The technique discussed below provides a transaction nesting depth testing instruction which, when decoded by an instruction decoder, triggers the processing circuitry to set at least one status value to one of a plurality of states selected dependent on the transaction nesting depth, where the plurality of states include a first state selected when the transaction nesting depth equals a predetermined number greater than zero, and at least one further state selected when the transaction nesting depth is greater than or less than the predetermined number. The instruction decoder supports an instruction set architecture (ISA) comprising at least one type of conditional branch instruction enabling the instruction decoder, in response to a single transaction nesting depth testing instruction followed by a single conditional branch instruction, to control the processing circuitry to set the at least one status value dependent on the transaction nesting depth and perform a conditional branch conditional on the at least one status value being in the first state.

Hence, whether or not the transaction depth is equal to the predetermined number greater than zero can be resolved through a single transaction nesting depth testing instruction and a single conditional branch instruction, enabling improved performance by reducing the number of instructions for controlling performance of an operation conditional on the nesting depth. This can be useful for resolving whether the current transaction is an inner or outer transaction of a nested set, for example.

Some versions of the transaction nesting depth test instruction could be provided for which the predetermined number is 2 or more. This can provide a faster way of determining whether a specific nesting depth is currently in effect.

However, in many cases it may be particularly useful for the predetermined number to be 1. Hence, the transaction nesting depth instruction may set the at least one status value to the first state when the transaction nesting depth is 1 and to the at least one further state when the transaction nesting depth is 0, or 2 or more. This could be particularly useful, since some operations may be required if in an outer transaction, but may not be required if in an inner transaction or not in a transaction at all.

Some forms of the transaction nesting depth instruction could result in one of two alternative states for the at least one status value: a first state used when the transaction nesting depth equals the predetermined number, and a second state used when the transaction nesting depth is either greater than or less than the predetermined number (in this case the at least one further state may comprise the second state only). This would enable testing of whether or not the system is currently at a specific level of nesting depth (e.g. when the predetermined number is 1, whether the processing is currently in an outer transaction).

However in practice it may be useful to distinguish three or more different cases, so that the at least one status value is set to one of: the first state when the transaction nesting depth equals the predetermined number, a second state when the transaction nesting depth is less than the predetermined number, and a third state when the transaction nesting depth is greater than the predetermined number. This enables subsequent conditional operations to distinguish three cases of interest (e.g. when the predetermined number is 1, distinguishing whether not in a transaction at all, in an inner transaction and in an outer transaction, respectively).

The ISA supported by the instruction decoder may comprise one or more types of conditional branch instruction which (collectively) enable the instruction decoder to control the processing circuitry to set the at least one status value dependent on the transaction nesting depth and perform a conditional branch conditional on the at least one status value being in a target state of the plurality of states, in response to a single transaction nesting depth testing instruction followed by a single conditional branch instruction regardless of whether the target state is the first state, the second state or the third state. With this approach, when the predetermined number is 1, all 3 questions of whether processing is in a transaction at all (second state), whether processing is in an outer transaction (first state) and whether processing is in an inner transaction (third state) can all be resolved with a single transaction nesting depth testing instruction and a single conditional branch instruction.

There are a number of ways in which the transaction nesting depth testing instruction can be implemented.

In one example, the apparatus may have a condition status storage element which stores at least one condition status value indicative of at least one property of a processing result of a previously executed instruction. In response to decoding of the transaction nesting depth testing instruction by the instruction decoder, the processing circuitry may set the at least one condition status value to correspond with a result of comparing the transaction nesting depth with the predetermined number.

The condition status storage element may be used by a condition-status-dependent type of conditional branch instruction to select whether to branch to a branch target address depending on whether the at least one status value stored in the condition status storage element satisfies a test condition specified by the conditional branch instruction. For example, the at least one condition status value may comprise condition code values which are set in response to some types of program instruction executed by the processing logic, dependent on some property of the result. For example, the at least one condition status value could include a first flag which indicates whether a result of a program instruction is zero, a second flag indicating whether the result is negative, a third flag indicating whether a carry out from the most significant bit of a processing result was generated because the result would not fit in the number of bits provided, and/or a fourth flag which indicates whether there was a wrap around from a positive to a negative value in a two's complement arithmetic operation. It will be appreciated that other properties of results could also be represented using the condition flags. The conditional branch instruction may specify a condition code representing a particular set of criteria to be met by the condition codes for the test condition to be satisfied.

Hence, in some examples the transaction nesting depth testing instruction may write to the same condition status flags that are used by other instructions and can be tested using general condition-status-dependent conditional branch instructions specifying a test condition, with the test condition selected depending on the particular transaction nesting depth which is to trigger the branch. This enables processing of sections of code which require operations to be performed conditionally depending on whether the processing is currently within a transaction or within an outer or inner transaction to be performed more efficiently.

Setting the at least one condition status value may not be the only result of the transaction nesting depth test instruction. For example, in some variants, in addition to setting the at least one condition status value, the decoding of the transaction nesting depth testing instruction could also trigger the processing circuitry to write a transaction nesting depth value which represents the transaction nesting depth to a general purpose register for storing operands for instructions. The general purpose register may be specified by the encoding of the transaction nesting depth testing instruction. Hence, more complex operations which require knowledge of the precise transaction nesting depth (including distinguishing between different levels of inner transactions) could then test the transaction nesting depth value written to the general purpose register in order to perform further operations.

In another example, the transaction nesting depth testing instruction may write the at least one status value to a general purpose register specified by the transaction nesting depth testing instruction.

For example, the at least one status value written to the general purpose register may have one of: a first encoding in which all bits are equal to 0; a second encoding in which a first predetermined bit is equal to 1 and a second predetermined bit is equal to 0; and a third encoding in which the first predetermined bit is equal to 0 and the second predetermined bit is equal to 1. The first state could be represented by any one of these three encodings. If the at least one further state comprises only a second state representing cases when the transaction nesting depth is either greater than or less than the predetermined number, then the second state may correspond to either of the other two encodings not used for the first state. In implementations where the at least one further state comprises separate second and third states representing cases when the transaction nesting depth is less than, or greater than, the predetermined number respectively, then the second and third states may take the other two encodings not used for the first state (either way round).

With such an encoding, different types of conditional branch instruction may be used to determine whether the at least one status value has a particular one of the first, second and third encodings (with the appropriate type of conditional branch instruction being selected by the programmer or compiler depending on the mapping between the states and encodings used, and which particular state is the target state of interest).

For example, the ISA may include a compare-with-zero type of conditional branch instruction specifying a target register. In response to decoding of the compare-with-zero type of conditional branch instruction, the processing circuitry may perform the conditional branch conditional on all bits of the target register being equal to 0. Hence, this enables testing of whether an earlier transaction nesting depth testing instruction set the at least one status value to the first encoding discussed above, using only a single conditional branch instruction following the single transaction nesting depth testing instruction.

The ISA may include a bit-test type of conditional branch instruction specifying a predetermined bit of a target register. In response to decoding of the bit-test type of conditional branch instruction, the processing circuitry may perform the conditional branch conditional on the predetermined bit of the target register being equal to 1, or conditional on the predetermined bit of the target register being equal to 0. In some implementations, bit-test-non-zero and bit-test-zero variants of the conditional branch instruction could be provided in the ISA to enable the testing of whether the predetermined bit is 1 or 0 respectively. The bit-test type of conditional branch instruction can be used to test whether an earlier transaction nesting depth testing instruction set the at least one status value to the second or third encoding discussed above, using a single conditional branch instruction following the single transaction nesting depth testing instruction.

The transactional memory support circuitry may include a number of resources for supporting execution of transactions using transactional memory mechanisms. For example the transactional memory support circuitry may comprise restoration state storage circuitry for storing transaction restoration state captured in response to the transaction start instruction to be restored on aborting the transaction. In some cases, the transaction start instruction of an outer transaction may trigger the capture of the transaction restoration state and capture of the transaction restoration state for inner transactions may be suppressed (when the transaction nesting depth is greater than zero at the time of encountering the transaction start instruction).

The transactional memory support circuitry could also comprise speculative result storage circuitry to store the results of at least some speculatively executed instructions for at least one transaction of at least one thread. In some cases only certain types of instructions may have their results stored to the speculative result storage circuitry, for example store instructions for writing to memory may have their store data held speculatively in the speculative result storage until the transaction can be committed, whereas general arithmetic instructions acting on registers could simply write to those registers as the restoration state can later allow those results to be discarded when state is rewound to an earlier point of execution.

The transactional memory support circuitry may also have conflict detection circuitry for detecting a conflict between a data access to a given address made within a transaction of a first thread and a data access to the same address made by another thread. An abort event can be triggered by the conflict detection circuitry in response to the detection of the conflict. Other reasons for abort events could include interrupts or exceptions occurring during the processing of a transaction, a lack of capacity in the storage within the transactional memory support circuitry for accommodating further speculative results of the transaction, or certain instructions that are not allowed to be accessed in a transaction being encountered. The transactional memory support circuitry may also have address tracking circuitry for tracking addresses accessed by instructions within a transaction, and the conflict detection circuitry may use the tracked addresses to identify the conflicts with other threads.

The apparatus may have a transaction nesting depth storage element to store a transaction nesting depth value representing the transaction nesting depth. For example an internal register may be provided. The register storing the transaction nesting depth value need not be software-accessible, hence the transaction nesting depth testing instruction may be provided to expose the transaction nesting depth to the software architecture.

In some cases, the stored transaction nesting depth value could correspond exactly to the current transaction nesting depth. For example, a counter can be maintained that starts at zero and is incremented on execution of a transaction start instruction, decremented on execution of a transaction end instruction, and reset to zero when processing of a transaction is aborted. However, there may also be other ways of representing the transaction depth. For example, if the counter starts at a value other than zero, then even though the transaction nesting depth may be zero when the processing is not currently within a transaction, the stored transaction depth value may be non zero (e.g. there could be an offset between the stored transaction depth value and the actual transaction depth).

Therefore, for the implementation in which the transaction nesting depth testing instruction sets the condition status storage element to correspond with a result of a comparison between the transaction nesting depth and the predetermined number, it is not required that there is an actual comparison between the stored transaction nesting depth value and the predetermined number greater than zero itself. Any comparison operation can be performed which generates an equivalent result to the result that would be generated, if a notional transaction nesting depth value which does indicate the actual number of executed transaction start instructions of a given thread for which the corresponding transaction remains unaborted and uncommitted was compared with the predetermined number. For example, if the stored transaction nesting depth value is in fact offset from the actual transaction nesting depth then the comparison may actually compare the stored value with a number which is offset from the predetermined number by a corresponding amount. Also in some cases, if the transaction nesting depth is encoded in some way within the stored value then again the comparison may be a more complex operation to decode the transaction nesting depth code and identify the corresponding status values to be written to the status storage element depending on the whether the transaction nesting depth corresponds to zero, one or more. Hence, there may be a number of ways of achieving the same result. From the point of view of the instruction set architecture, the result is equivalent to the case when a value explicitly indicating the transaction nesting depth is compared with a predetermined number greater than zero, but it does not matter whether this result is actually generated in this way.

A corresponding computer program may control a host data processing apparatus to provide an instruction execution environment for execution of instructions, in which processing program logic supports a transaction nesting depth testing instruction and ISA as discussed above. Such a computer program may allow a generic host data processing apparatus which does not itself have the transactional memory support circuitry or the instruction decoder support for the transaction nesting depth testing instruction to benefit from the transactional memory functionality and the improved testing of nesting depth, even though there may be no actual hardware providing these features. Instead the computer program provides program logic, such as sets of instructions or data structures, which emulate this functionality, enabling the generic host data processing apparatus to execute code intended for execution on an apparatus which does provide such hardware features.

FIG. 1 illustrates an example of a data processing apparatus 2 with hardware transactional memory (HTM) support. The apparatus has processing logic 4 for executing instructions to carry out data processing operations. For example the processing logic 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. The architectural registers 6 include a status register 7 for storing at least one status value (e.g. a condition flag) indicating a property of a result of a previously executed instruction. An instruction decoder 8 decodes instructions fetched from an instruction cache 10 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or main memory 16 into the architectural registers 6, and store operations (in response to store instructions decoded by the instruction decoder 8) to store a data value from the architectural registers 6 to the data cache 14 or memory 16.

The apparatus 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. The HTM resources 20 also include a nesting depth register 30 which stores a nesting depth value which represents the current transaction nesting depth of any transactions which are in flight within the processing logic 4.

Figure 2:
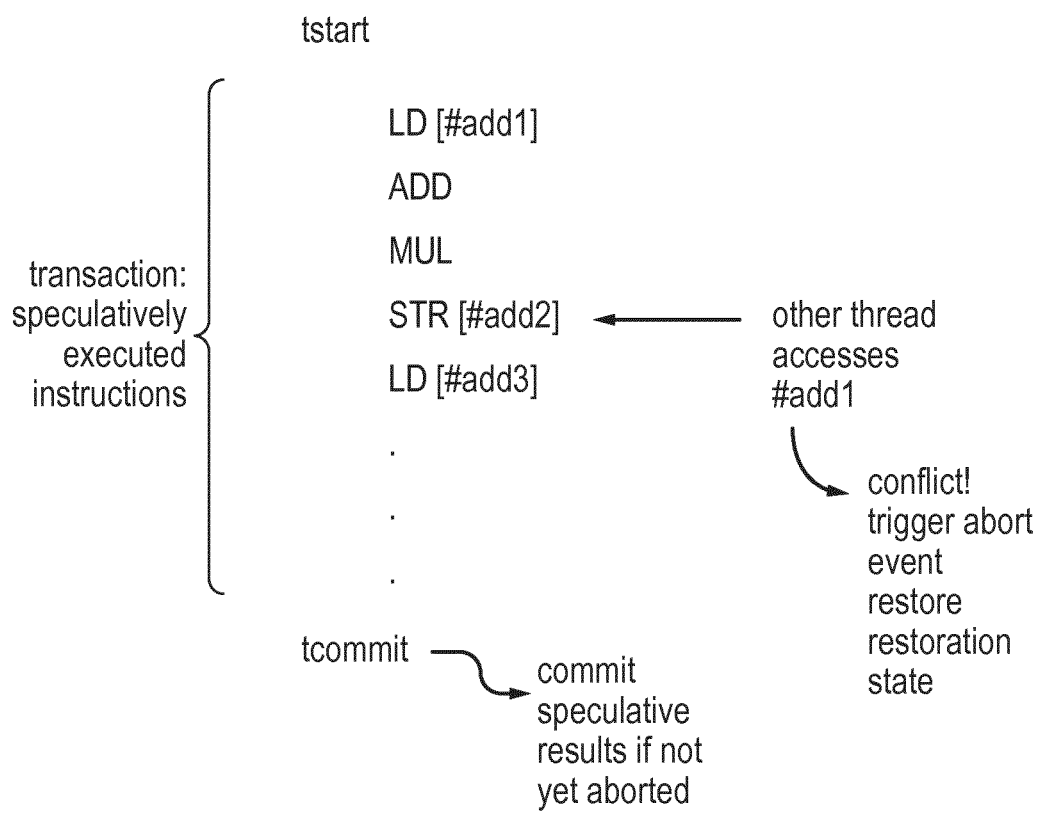
FIG. 2 shows an example of processing of a transaction using transactional memory resources.

FIG. 2 shows an example of executing a transaction within a given thread using the transactional memory support circuitry 20 and the processing logic 4. A transaction is a section of program code which is bounded by a transaction start instruction (tstart) and a transaction end instruction (tcommit). As shown in FIG. 2, in response to the transaction start instruction the current architectural state in the architectural registers 6 is captured and stored in the restoration state storage circuitry 28. The processing logic 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of made accesses using the load/store unit 12 in response to other threads. At least some speculative results of the instructions within the transaction are stored within the speculative result storage circuitry 22. For example the value stored to the cache or to memory in response to a store instruction STR may be held in the speculative result storage 22 while the transaction remains pending. If the transaction end instruction (tcommit) is reached without an abort event occurring in the meantime, then in response to the transaction end instruction the speculative results are committed. On committing the transaction, any results stored in the speculative results storage 22 for that thread may be written to the data cache 14 or memory 16 and the restoration state 28 can be discarded or permitted to be overwritten as it is no longer needed to rewind architectural state to the point before the transaction start instruction was encountered.

On the other hand, if an abort event occurs, for example when a conflict is detected by the conflict detection circuitry 26 when another thread accesses an address already accessed by the transaction, then an abort of the transaction is triggered and the restoration state from the restoration state storage 28 is restored to the architectural registers 6. Other causes of an abort event could for example include execution of an instruction which is not allowed to be executed within a transaction, insufficient resources within the speculative result storage 22 or an address tracking circuitry 24 for handling the speculative results or addresses required by a given transaction, or an interrupt being received during the transaction.

Figure 3:
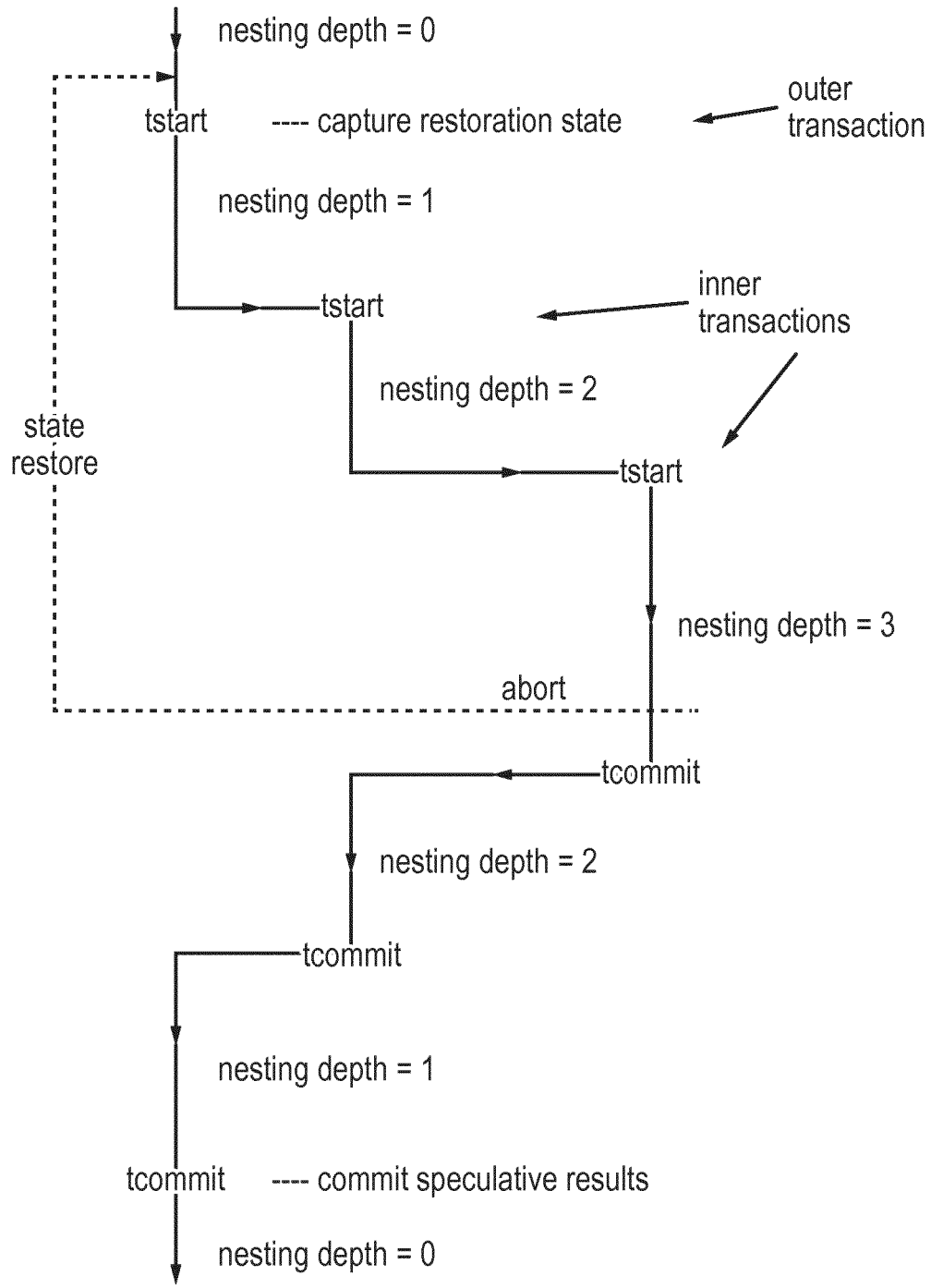
FIG. 3 shows an example of a nested set of transactions.

FIG. 3 shows an example of a nested set of transactions. Initially, when processing code for which any previous transactions have been committed or aborted, after which a subsequent start instruction has not yet been executed, the nesting depth represented by the nesting depth value 30 is 0. In response to the first transaction start instruction, the current architectural state is captured and stored to the restoration state storage 28 and the nesting depth is incremented to 1. Subsequent instructions are processed within this outer transaction of the nested set of transactions. If another transaction start instruction is encountered before reaching the transaction end instruction of the outer transaction, then no restoration state is captured to save resources within the restoration state storage 28, but the nesting depth register 30 is incremented to indicate a nesting depth of 2. Similarly, a subsequent transaction start instruction may trigger a further increment to the nesting depth to give a nesting depth value of 3 as shown in FIG. 3. The transactions which corresponds to a transaction start instruction executed when the nesting depth is non-zero (and for which instructions within the transaction will have a nesting depth of 2 or more) are considered inner transactions, as opposed to the outer transaction for which the transaction start instruction was executed when the nesting depth was 0 and for which the instructions within the transaction will correspond to a nesting depth of 1.

If an abort event occurs at any point following the outer transaction's transaction start instruction, the state stored in the restoration state storage 28 is restored to the architectural register 6, which means that processing is effectively rewound to the original transaction start instruction of the outer transaction. Hence, it may not be possible to restore state corresponding to the transaction start instructions of the inner transactions. The nesting depth is reset to 0 in response to the abort event.

In the absence of any abort event, the transaction end instructions of the inner transactions are ignored and any speculative results of the processing performed since the outer transaction's transaction start instruction are committed when the transaction end instruction corresponding to the outer transaction is reached. That is, when a transaction end instruction is executed and the nesting depth is 2 or more, no commitment of results occurs. The results are committed when a transaction end instruction is executed when the nesting depth is 1. In response to each transaction end instruction, the nesting depth is decremented, and when the nesting depth returns to 0 this means that all the outstanding transactions have completed and processing is now outside any transaction. This approach to handling transactions means that it is only necessary to allocate one set of speculative result storage resources, address tracking resources or restoration state storage resources to a particular thread regardless of the number of nested transactions, saving more resources for other threads to execute transactions.

However, sometimes software may need to know whether the current processing is within a transaction or not, and if so, whether the current processing is inside an inner transaction or an outer transaction.

Figures 4, 5:
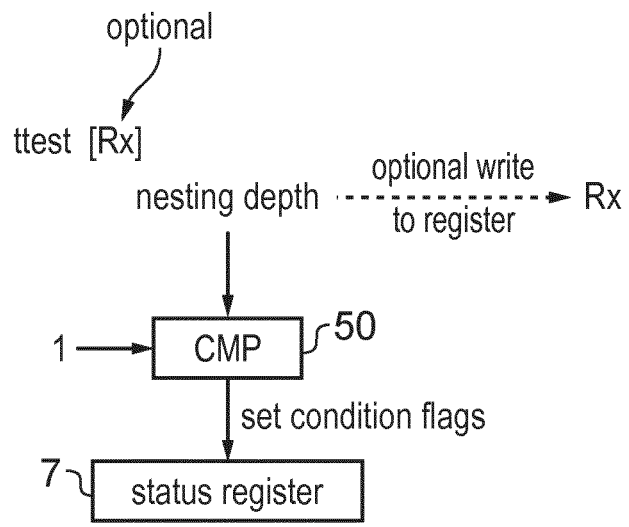
FIG. 4 shows a first example of a transaction nesting depth testing instruction.
FIG. 5 shows an example of setting at least one status value to correspond with a result of comparing the transaction nesting depth with 1.

FIG. 4 shows a first example of a transaction depth testing (ttest) instruction for resolving these questions. In response to the transaction depth testing instruction the instruction decoder 8 controls the processing logic 4 to perform an operation which is equivalent to the result of comparing the current transaction nesting depth with a predetermined value greater than zero. In this example the predetermined number is 1. In response to the comparison, the condition flags in the status register 7 are set to a value dependent on the comparison result. Optionally, some variants of the transaction depth testing instruction may also specify an additional general purpose register Rx and if so then the nesting depth value which represents the current transaction nesting depth may be written to the specified register.

FIG. 5 shows an example of setting the status flags in the status register 7 depending on the comparison. The status flags include:
  a negative flag N which is set to 0 when the result of an instruction is positive and 1 when the result is negative;
  a zero flag Z which is set to 1 when a result is zero and 0 when a result is non-zero;
  a carry flag C which is set to 1 when a result value does not fit within the number of bits available and so a carry out of the most significant bit is generated, and otherwise is 0; and
  an overflow flag V which is set to 1 when there is an overflow from the most positive value representable using a two's complement binary value to the most negative value representable in the two's complement format or vice versa.

As shown in the table of FIG. 5, when the nesting depth is 0 (not in a transaction), in response to the ttest instruction the status flags are set to a first state in which the Z and C flags are set to 0 and the N and V flags can take any value (either 0 or 1). When the transaction nesting depth is 1 (in an outer transaction) the status flags are set to a second state in which the Z and C flags are both set to 1 and the N and V flags again can take any value. When the transaction nesting depth is greater than 1 (within an inner transaction) the status flags are set to a third state in which the Z flag is set to 0, the C flag is set to 1 to and again the flags N and V may take any value. This enables a subsequent conditional branch instruction or other conditional instruction to perform conditional operations based on the status of the flags. A conditional instruction may specify a condition code which identifies a certain test condition to be applied to the flags in the status register 7. The following table represents different condition codes and the corresponding values of the flags to be satisfied in order to satisfy that test condition:

| Code | Meaning | Flags Tested |
|---|---|---|
| EQ | Equal | Z == 1 |
| NE | Not equal | Z == 0 |
| CS or HS | Unsigned higher or same (or carry set) | C == 1 |
| CC or LO | Unsigned lower (or carry clear) | C == 0 |
| MI | Negative | N == 1 |
| PL | Positive or zero | N == 0 |
| VS | Signed overflow | V == 1 |
| VC | No signed overflow | V == 0 |
| HI | Unsigned higher | C == 1 AND Z == 0 |
| LS | Unsigned lower or same | C == 0 AND Z == 1 |
| GE | Signed greater than or equal | N == V |
| LT | Signed less than | N! = V (N not equal to V) |
| GT | Signed greater than | Z == 0 AND N == V |
| LE | Signed less than or equal | Z == 1 AND N! = V |
| AL | Always | None tested (always true) |

With this approach any of the following questions can be answered using a sequence of two instructions as follows:

| Question | Code sequence |
|---|---|
| Is execution inside or outside a transaction? | 1. TTEST [nesting depth testing instruction as discussed above] 2. B.LO [branch if outside transaction], or B.HS [branch if inside transaction]. |
| Is execution in an outermost transaction (a transaction not nested inside another transaction)? | 1. TTEST 2. B.EQ [branch if in outer transaction] |
| Is execution in an inner transaction (a transaction nested inside another transaction)? | 1. TTEST 2. B.HI [branch if in inner transaction] |

FIG. 4 shows the example where the comparator 50 compares the nesting depth with the predetermined value of 1. An equivalent result could be achieved by subtracting 1 from the nesting depth and setting the flags based on the result. Also in some cases, the nesting depth value may not be represented in a form exactly corresponding to the actual nesting depth as indicated in FIG. 3, and in this case the processing logic 4 may include some circuitry for interpreting the representation of the nesting depth used in the nesting depth register 30 and generating equivalent results as if an explicit indication of nesting depth was compared with one. Also in some variants instead of comparing with 1, the transaction test instruction could compare with 2 or more.

FIG. 6 shows a second example of a transaction nesting depth testing instruction, which in this example specifies a general purpose register Rx to which at least one status value should be written with a state selected depending on the current transaction nesting depth indicated by nesting depth register 30. As shown in the table of FIG. 6, two bits of the specified register Rx may be set to an encoding 0b00, 0b01 or 0b10 depending on whether the nesting depth is 0, 1 or greater than 1. All other bits of the specified register may be set to 0. While FIG. 6 shows one particular mapping between the transaction nesting depths of 0, 1 and >1 and the 3 encodings, other implementations could switch the mappings used (e.g. another implementation could use 0b00 to represent one of the cases when the nesting depth was 1 or greater than 1 . . . ). However, the approach shown in the table of FIG. 6 may be more intuitive as then the pair of bits corresponds to a binary value of the nesting depth (saturated at 2 so that regardless of whether the nesting depth is 2 or more, the encoding is 0b10).

As shown at the bottom of FIG. 6, different types of conditional branch instruction may be supported by the ISA implemented in the instruction decoder 8 and processing circuitry 4. These forms of conditional branch instruction enable testing of whether the nesting depth matches a particular target state with only a single ttest instruction and a single conditional branch instruction, regardless of whether the target state of interest is any of the 3 states shown in the table of FIG. 6. It will be appreciated that one or more intervening instructions, which the conditional branch instruction is independent of and which do not overwrite the result of the ttest instruction, could be executed between the ttest instruction and the conditional branch instruction—in this case as the intervening instructions do not affect the transaction nesting depth comparison and branch the setting of the status value and conditional branch are still effectively controlled by two instructions.

If the target state of interest corresponds to 0b00 (e.g. nesting depth 0 in the example of FIG. 6), then a compare-with-zero type of conditional branch instruction (CBZ) may be used which specifies a source register Rn and a label indicating a branch target address. In response to the CBZ instruction, the decoder 8 controls the processing logic 4 to branch to the branch target address indicated by the label if all bits in the source register Rn are 0. Hence, by executing a CBZ instruction specifying as the source register Rn the destination register Rx of a previous ttest instruction, this enables a conditional branch dependent on the 0b00 state to be made with only two instructions.

If the target state of interest corresponds to 0b01 or 0b10, then a bit-test type of conditional branch instruction (TBZ or TBNZ) may be used which specifies as operands a source register Rt, an immediate value #imm identifying a specific bit position within the source register, and a label indicating a branch target address. In other examples, the bit position could be indicated by a further source register instead of an immediate value. In response to the TBZ instruction, the decoder 8 controls the processing logic 4 to branch to the branch target address indicated by the label if the bit at the specified bit position is equal to 0. In response to the TBNZ instruction, the decoder 8 controls the processing logic 4 to branch to the branch target address indicated by the label if the bit at the specified bit position is equal to 1. It is not essential to provide both forms of TBZ/TBNZ instruction as either form can be used to test both the 0b01 and 0b10 states, by varying which bit position is specified (by #imm) as the bit position to be tested. Again, by executing a TBZ or TBNZ instruction for which the source register Rt corresponds to the destination register Rx of a previous ttest instruction, this enables a conditional branch dependent on the 0b01 or 0b10 state to be made with two instructions.

Figure 7:
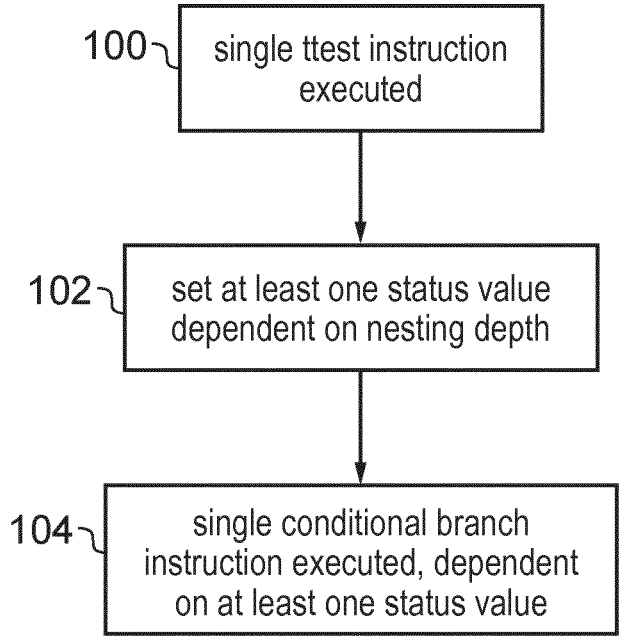
FIG. 7 is a flow diagram illustrating a method of processing a transaction nesting depth testing instruction.

FIG. 7 shows a flow diagram for controlling execution of a transaction depth testing instruction. At step 100, a single transaction nesting depth testing instruction is executed. In response to the control signals generated by the instruction decoder 8 in response to the transaction nesting depth testing instruction, at step 102 the processing circuitry sets at least one status value depending on the transaction nesting depth, to one of a plurality of states including at least a first state selected when the transaction nesting depth equals a predetermined value (e.g. 1) and at least one further state when the transaction nesting depth is greater than or less than the predetermined value. At step 104, a single conditional branch instruction is executed, depending on the at least one status value set in response to the single ttest instruction.

Figure 8:
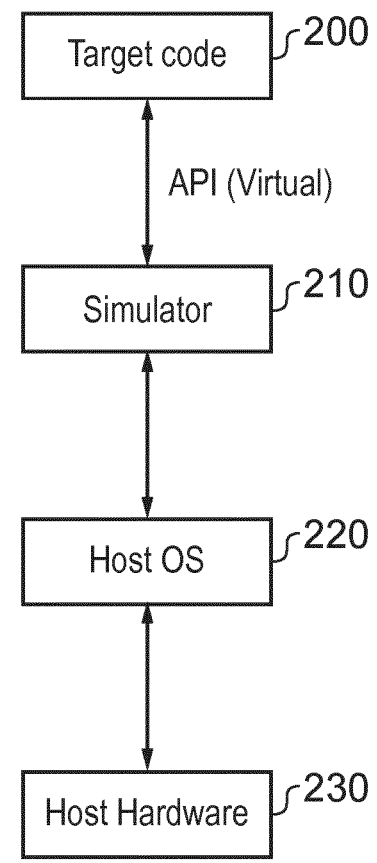
FIG. 8 illustrates a simulator example that may be used.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200, including a transaction nesting depth testing instruction as described above, may be executed from within the instruction execution environment using the simulator program 210, so that a host computer 230 which does not actually have the hardware features of the apparatus 2 discussed above can emulate these features.

Further example arrangements are set out in the following clauses:
(1) An apparatus comprising:
an instruction decoder to decode instructions;
processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions of the transaction until the transaction end instruction is reached, and to abort processing of the transaction when an abort event occurs before reaching the transaction end instruction; and
a status storage element to store at least one status value indicative of at least one property of a processing result of a previously executed instruction;
wherein in response to decoding of a transaction nesting depth testing instruction by the instruction decoder, the processing circuitry is configured to set said at least one status value to correspond with a result of comparing a transaction nesting depth with a predetermined number greater than zero, where said transaction nesting depth is indicative of a number of executed transaction start instructions of a given thread for which the corresponding transaction remains unaborted and uncommitted.
(2) A data processing method comprising:
performing data processing in response to decoded instructions using processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions of the transaction until the transaction end instruction is reached, and to abort processing of the transaction when an abort event occurs before reaching the transaction end instruction;
storing at least one status value indicative of at least one property of a processing result of a previously executed instruction; and
in response to decoding of a transaction nesting depth testing instruction, setting said at least one status value to correspond with a result of comparing a transaction nesting depth with a predetermined number greater than zero, where said transaction nesting depth is indicative of a number of executed transaction start instructions of a given thread for which the corresponding transaction remains unaborted and uncommitted.
(3) A computer program for controlling a host data processing apparatus to provide an instruction execution environment for execution of instructions, comprising:
processing program logic supporting execution of a transaction within a thread of data processing, the transaction comprising instructions of the thread executed speculatively between a transaction start instruction and a transaction end instruction, for which the processing program logic is configured to prevent commitment of results of the speculatively executed instructions of the transaction until the transaction end instruction is reached, and to abort processing of the transaction when an abort event occurs before reaching the transaction end instruction; and
a status data structure to store at least one status value indicative of at least one property of a processing result of a previously executed instruction;
wherein in response to a transaction nesting depth testing instruction, the processing program logic is configured to set said at least one status value to correspond with a result of comparing a transaction nesting depth with a predetermined number greater than zero, where said transaction nesting depth is indicative of a number of executed transaction start instructions of a given thread for which the corresponding transaction remains unaborted and uncommitted.

(4) A storage medium storing the computer program of clause (3).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
an instruction decoder to decode instructions;
processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions of the transaction until the transaction end instruction is reached, and to abort processing of the transaction when an abort event occurs before reaching the transaction end instruction; and
condition status storage to store one or more condition status values indicative of at least one property of a processing result of a previously executed instruction,
wherein in response to decoding of a transaction nesting depth testing instruction by the instruction decoder, the processing circuitry is configured to set at least one status value to one of a plurality of states selected dependent on a transaction nesting depth indicative of a number of executed transaction start instructions of a given thread for which the corresponding transaction remains unaborted and uncommitted, the plurality of states including a first state selected when the transaction nesting depth equals a predetermined number greater than zero, and a further state selected when the transaction nesting depth is greater than the predetermined number, wherein when the transaction nesting depth is less than the predetermined number, the processing circuitry is configured to set the at least one status value to the further state or a second state, wherein the further state differs from the first state and the second state differs from the first state;
wherein the instruction decoder is configured to support an instruction set architecture comprising at least one type of conditional branch instruction enabling the instruction decoder, in response to a single transaction nesting depth testing instruction followed by a single conditional branch instruction without an intervening further instruction to compare the transaction nesting depth between the single transaction nesting depth testing instruction and the single conditional branch instruction, to control the processing circuitry to set the at least one status value dependent on the transaction nesting depth and perform a conditional branch having different outcomes depending on whether the at least one status value indicates that the transaction nesting depth is equal to the predetermined number or greater than the predetermined number; and
wherein in response to decoding of the transaction nesting depth testing instruction by the instruction decoder, the processing circuitry is configured to set the one or more condition status values to correspond with a result of comparing the transaction nesting depth with the predetermined number.

2. The apparatus according to claim 1, wherein the predetermined number is 1.

3. The apparatus according to claim 1, wherein the instruction set architecture comprises one or more types of conditional branch instruction enabling the instruction decoder to control the processing circuitry to set the at least one status value dependent on the transaction nesting depth and perform a conditional branch conditional on the at least one status value being in a target state of the plurality of states, in response to a single transaction nesting depth testing instruction followed by a single conditional branch instruction regardless of whether the target state is the first state, the second state or the further state.

4. The apparatus according to claim 1, wherein in response to the instruction decoder decoding a condition-status-dependent conditional branch instruction specifying a test condition, the processing circuitry is configured to perform the conditional branch conditional on whether the one or more condition status values stored in the condition status storage satisfies the test condition.

5. The apparatus according to claim 1, comprising a plurality of general purpose registers to store operands for instructions;
wherein in response to decoding of the transaction nesting depth testing instruction by the instruction decoder, the processing circuitry is configured to write a transaction nesting depth value representing the transaction nesting depth to a general purpose register specified by the transaction nesting depth testing instruction.

6. The apparatus according to claim 1, wherein in the first state, the at least one status value has one of:
a first encoding in which all bits are equal to 0;
a second encoding in which a first predetermined bit is equal to 1 and a second predetermined bit is equal to 0; and
a third encoding in which the first predetermined bit is equal to 0 and the second predetermined bit is equal to 1.

7. The apparatus according to claim 1, wherein:
when the transaction nesting depth is less than the predetermined number, the processing circuitry is configured to set the at least one status value to the second state;
in a first one of the first, second and further states, the at least one status value has a first encoding in which all bits are equal to 0;
in a second one of the first, second and further states, the at least one status value has a second encoding in which a first predetermined bit is equal to 1 and a second predetermined bit is equal to 0; and in a third one of the first, second and further states, the at least one status value has a third encoding in which the first predetermined bit is equal to 0 and the second predetermined bit is equal to 1.

8. The apparatus according to claim 1, wherein in response to the instruction decoder decoding a bit-test type of conditional branch instruction specifying a predetermined bit of a target register, the processing circuitry is configured to perform the conditional branch conditional on the predetermined bit of the target register being equal to 1, or conditional on the predetermined bit of the target register being equal to 0.

9. The apparatus according to claim 1, wherein the transactional memory support circuitry comprises restoration state storage circuitry to store transaction restoration state captured in response to a given transaction start instruction of a given transaction to be restored on aborting the given transaction.

10. The apparatus according to claim 9, wherein the processing circuitry is configured to:
   capture the transaction restoration state in response to the given transaction start instruction when the transaction nesting depth equals zero, and
   suppress capture of the transaction restoration state in response to the given transaction start instruction when the transaction nesting depth is greater than zero.

11. The apparatus according to claim 1, wherein the transactional memory support circuitry comprises at least one of:
   speculative result storage circuitry to store the results of the speculatively executed instructions; and
   address tracking circuitry to track addresses accessed by instructions within a transaction.

12. The apparatus according to claim 1, wherein the transactional memory support circuitry comprises conflict detection circuitry to detect a conflict between a data access to a given address made within a transaction of a first thread and a data access to the same address made by another thread.

13. The apparatus according to claim 12, wherein the conflict detection circuitry is configured to trigger the abort event in response to detection of the conflict.

14. An apparatus comprising:
   an instruction decoder to decode instructions; and
   processing circuitry to perform data processing in response to the instructions decoded by the instruction decoder, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions of the transaction until the transaction end instruction is reached, and to abort processing of the transaction when an abort event occurs before reaching the transaction end instruction;
   wherein in response to decoding of a transaction nesting depth testing instruction by the instruction decoder, the processing circuitry is configured to set at least one status value to one of a plurality of states selected dependent on a transaction nesting depth indicative of a number of executed transaction start instructions of a given thread for which the corresponding transaction remains unaborted and uncommitted, the plurality of states including a first state selected when the transaction nesting depth equals a predetermined number greater than zero, and a further state selected when the transaction nesting depth is greater than the predetermined number, wherein when the transaction nesting depth is less than the predetermined number, the processing circuitry is configured to set the at least one status value to the further state or a second state, wherein the further state differs from the first state and the second state differs from the first state; and
   the instruction decoder is configured to support an instruction set architecture comprising at least one type of conditional branch instruction enabling the instruction decoder, in response to a single transaction nesting depth testing instruction followed by a single conditional branch instruction without an intervening further instruction to compare the transaction nesting depth between the single transaction nesting depth testing instruction and the single conditional branch instruction, to control the processing circuitry to set the at least one status value dependent on the transaction nesting depth and perform a conditional branch having different outcomes depending on whether the at least one status value indicates that the transaction nesting depth is equal to the predetermined number or greater than the predetermined number,
   wherein in response to the instruction decoder decoding a compare-with-zero type of conditional branch instruction specifying a target register, the processing circuitry is configured to perform the conditional branch conditional on all bits of the target register being equal to 0.

15. A non-transitory storage medium storing a computer program for controlling a host data processing apparatus to provide an instruction execution environment for execution of instructions, the computer program comprising:
   processing program logic to support execution of a transaction within a thread of data processing, the transaction comprising instructions of the thread executed speculatively between a transaction start instruction and a transaction end instruction, for which the processing program logic is configured to prevent commitment of results of the speculatively executed instructions of the transaction until the transaction end instruction is reached, and to abort processing of the transaction when an abort event occurs before reaching the transaction end instruction; and
   wherein in response to a transaction nesting depth testing instruction, the processing program logic is configured to set at least one status value to one of a plurality of states selected dependent on a transaction nesting depth indicative of a number of executed transaction start instructions of a given thread for which the corresponding transaction remains unaborted and uncommitted, the plurality of states including a first state selected when the transaction nesting depth equals a predetermined number greater than zero, and a further state selected when the transaction nesting depth is greater than the predetermined number, wherein when the transaction nesting depth is less than the predetermined number, the processing program logic is configured to set the at least one status value to the further state or a second state, wherein the further state differs from the first state and the second state differs from the first state; and
   the processing program logic is configured to support an instruction set architecture comprising at least one type of conditional branch instruction enabling the processing program logic, in response to a single transaction nesting depth testing instruction followed by a single conditional branch instruction without an intervening further instruction to compare the transaction nesting depth between the single transaction nesting depth testing instruction and the single conditional branch instruction, to set the at least one status value dependent on the transaction nesting depth and perform a conditional branch having different outcomes depending on whether the at least one status indicates that the transaction nesting depth is equal to the predetermined number or greater than the predetermined number; and wherein in response to the transaction nesting depth testing instruction, the processing program logic is configured to set at least one condition status value, which is stored in a condition status storage data structure to indicate at least one property of a processing result of a previously executed instruction, to correspond with a result of comparing the transaction nesting depth with the predetermined number.

\* \* \* \* \*